April 28, 1931. H. F. COOPER 1,802,876
VEHICLE BODY
Filed Sept. 8, 1927 3 Sheets-Sheet 1
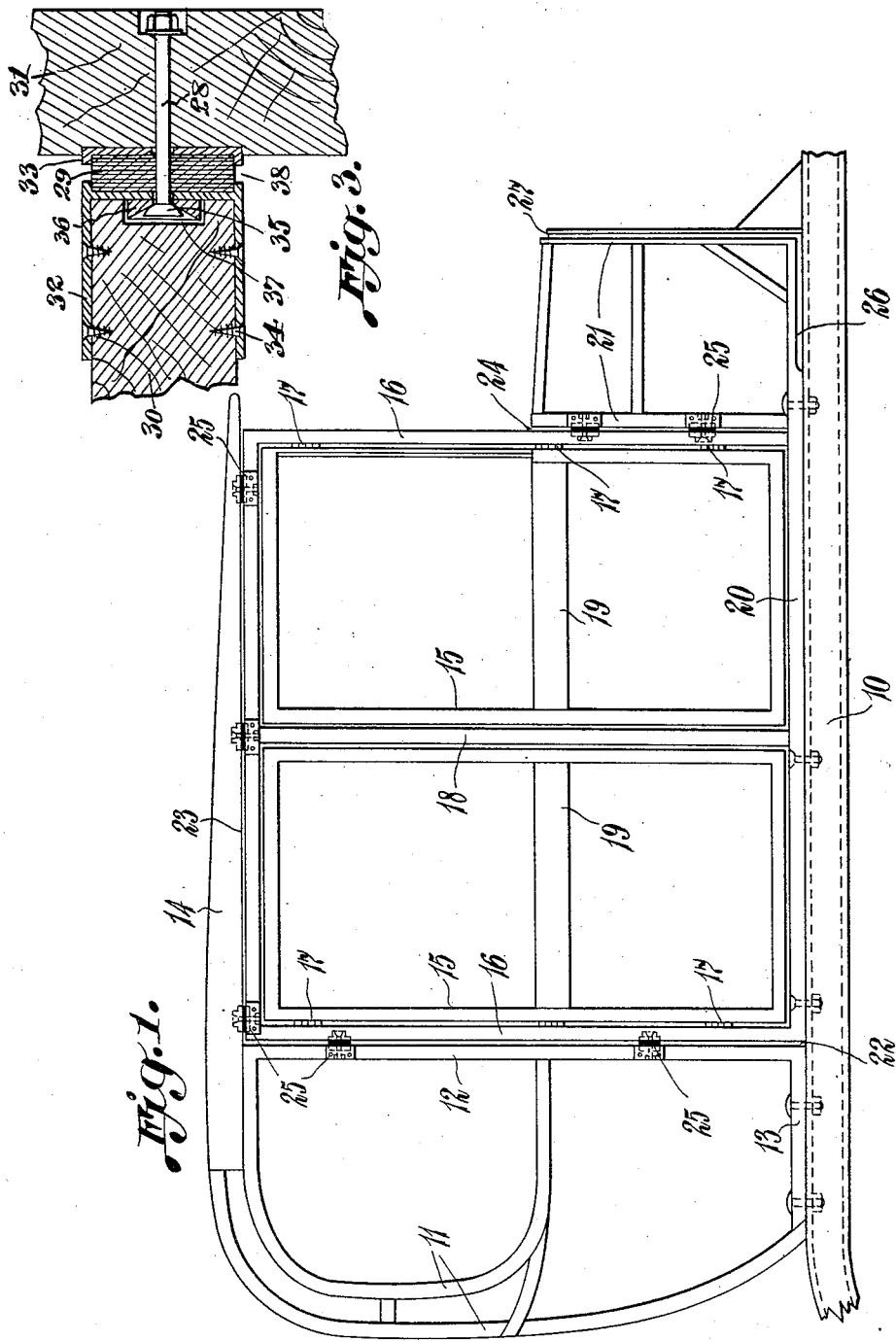
Inventor:
Herbert Frederick Cooper
By [signature]
Attorney April 28, 1931. H. F. COOPER 1,802,876
VEHICLE BODY
Filed Sept. 8, 1927  3 Sheets-Sheet 2
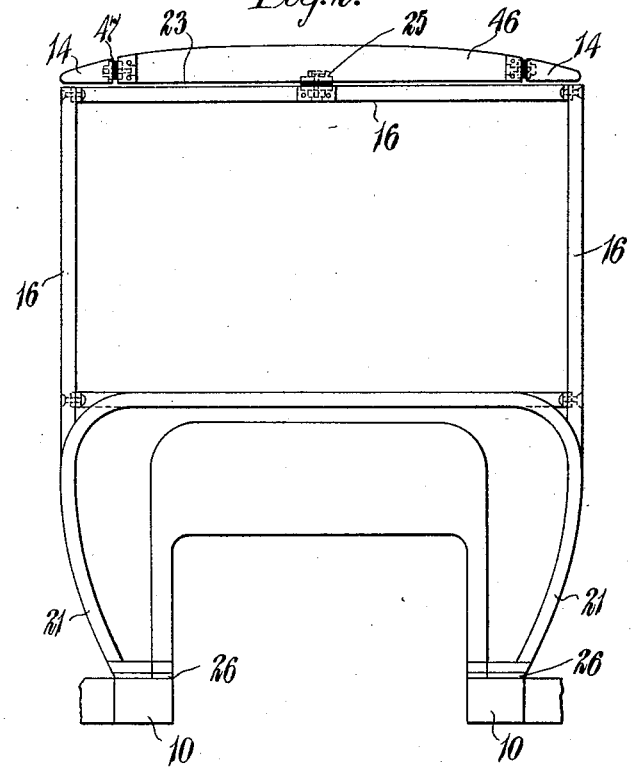
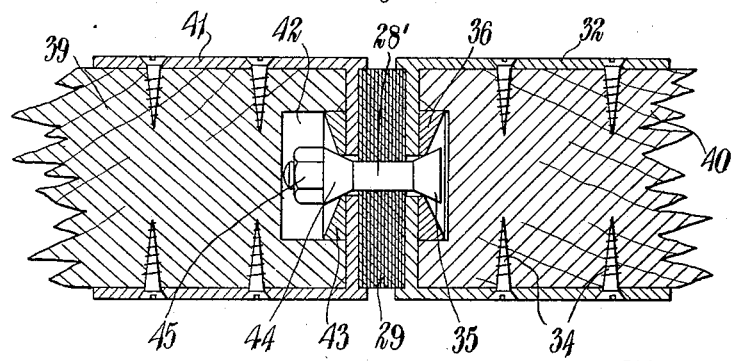
Inventor:
Herbert Frederick Cooper
By
Attorney

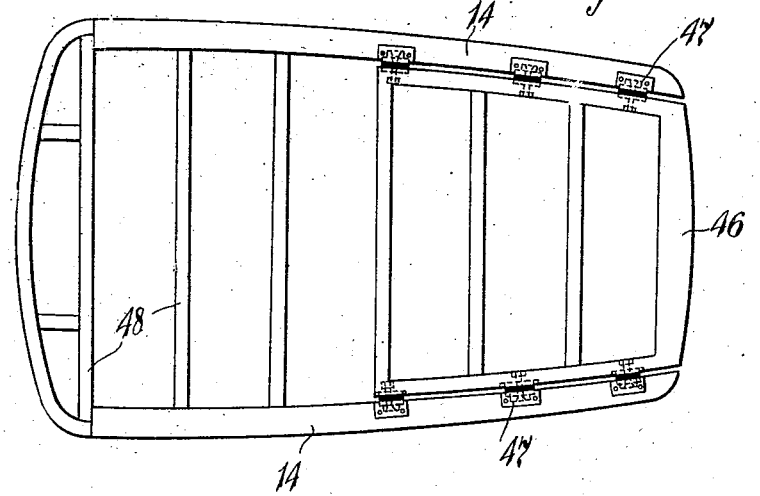
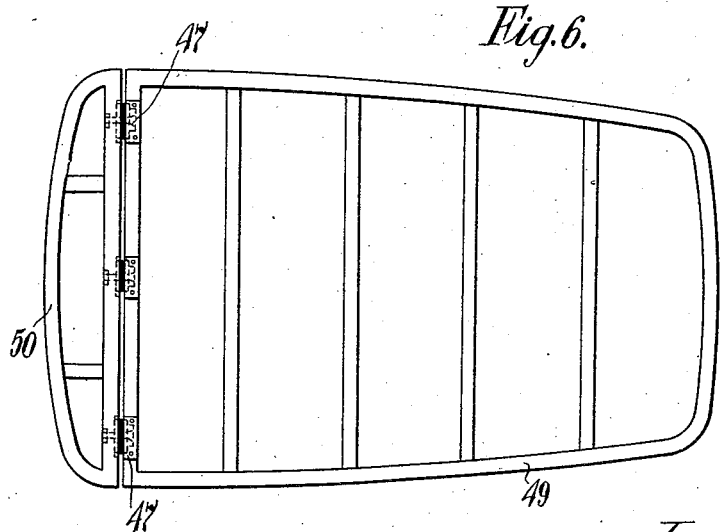

Patented Apr. 28, 1931

1,802,876

UNITED STATES PATENT OFFICE

HERBERT FREDERICK COOPER, OF LONDON, ENGLAND, ASSIGNOR OF ONE-HALF TO WILLIAM DRURY, OF LONDON, ENGLAND

VEHICLE BODY

Application filed September 8, 1927, Serial No. 218,254, and in Great Britain September 8, 1926.

This invention concerns improvements in or relating to the bodies of motor and like vehicles and has for its object to provide an improved body of the flexible type, i. e. a body in which various parts are connected together in such a manner that they can yield relatively one to another without developing slack joints.

In the usual rigidly constructed body the body-framework is itself rigidly built and is rigidly connected to the chassis frame, with the result that every movement set up in the chassis when travelling is to a considerable extent transmitted to the body so that, no matter how firmly the latter is fitted together, loose joints are sooner or later developed. This gives rise to noises in the body during travel and difficulties are encountered in the fitting of doors, screens and the like.

With the object of preventing or minimizing these drawbacks, in accordance with my invention the body of a saloon or like car is at least partially suspended in a flexible manner from the chassis or from the rigid body portion connected rigidly thereto or from both chassis and body. In all cases the doors are mounted in a frame that is at least partly mounted in a flexible manner, while if desired other parts such as the roof may be so mounted as will be hereinafter described.

In order that the invention may be more readily understood reference will now be made to the accompanying drawings, illustrating some embodiments of the same by way of example, and wherein:—

Fig. 1 is a side elevation of the framework of a saloon body according to the invention;

Fig. 2 is a front elevation thereof;

Figs. 3 and 4 are sectional views of alternative forms of flexible joint that may be used in accordance with the invention;

Figs. 5 and 6 are plan views of alternative roof constructions.

Referring firstly to Figs. 1 and 2, wherein 10 indicates the usual longitudinal chassis members, the framework of the body at the rear thereof consists mainly of rigid members 11 and 12 integral with or rigidly connected to the usual bottom side members 13, which are as usual rigidly bolted to the longitudinals 10, and supporting at the top the cant rails 14.

Instead of the doors, the frames of which are indicated at 15, being hinged in the manner now employed to a framework extending from and rigid with the frame above described they are in accordance with the invention mounted in separate frames which are wholly or in part flexibly mounted on the chassis frame and the rigid portion on the body frame. This separate frame for the doors is designated 16, the hinges by which the doors are connected thereto being indicated at 17. The frame 16 is braced by a vertical strut 18 and the door frames 15 are braced by cross-members 19.

The lower members 20 of the frame 16 correspond to the usual "bottom sides" of the body and may as shown be bolted to the longitudinals 10 in the manner usually adopted, since the amount of "whip" or twist experienced at this part of the body is negligible. The remainder of this frame, however, is spaced from the rigid frame 12, the cant rails 14 and the scuttle frame 21 so as to leave clearances at 22, 23 and 24 respectively (Fig. 1). These spaces may be left unfilled if they are to be covered by the fabric or panelling subsequently applied but, whether subsequently covered or not, are preferably filled with some flexible material such as felt, rubber tubing or the like.

The flexible mounting of the frame 16 above referred to is effected by the use of flexible joints 25, the preferred forms of which will be hereinafter described with reference to Figs. 3 and 4. While such joints have been shown provided at both sides and on the top of the frame 16 it will be readily appreciated that this arrangement is not essential and that, for example, the joints between the said frame and the members 12 might be omitted.

If desired the frame 16 might be entirely isolated from the chassis and rigid portion of the body, in which event the lower members 20 thereof would be flexibly connected by joints 25 to the usual "bottom sides". In such an arrangement the members 13 could be extended along the chassis for this purpose.

In either construction the flexible mounting of the frame 16 prevents or considerably minimizes the transmission of chassis stress and strain to the body. Owing to the flexible nature of the usual chassis frame it is quite common when the car is travelling over uneven surfaces or turning corners for the fore part of the chassis to twist in one direction while the rear part moves in the opposite direction. Again it is quite usual for "whipping" to occur by reason of road cambering or the like. In the ordinary type of body construction these stresses are directly transmitted to the body, with the result that the joints thereof eventually become loose and entail creaking and rattling of the frame, difficulty in shutting doors, etc.

By the arrangements according to the invention however, the twisting and like stresses referred to are not wholly transmitted to the body, with the result that the disadvantages mentioned are obviated or at least partially prevented. This desirable result is enhanced when, as hereinafter described, the car roof is in part flexibly mounted.

In the arrangement shown in Fig. 1, the scuttle frame 21 is shown mounted on extensions of the members 20 but this is not essential; if, however, this construction is employed a space is preferably left as at 26 to allow flexing of the scuttle frame, this space being filled as mentioned above if desired. If the scuttle frame forms a separate unit it may be flexibly mounted or not as desired, though in either case flexible joints are conveniently inserted between the scuttle frame and the frame 16, as indicated in Fig. 1. A space 27 is left at the front of the scuttle frame.

The front screen (not shown) usually employed in a saloon body at the junction of the front doors and the scuttle may also be flexibly mounted if desired.

It will be seen from Fig. 2 that the front end of the frame 16 is only connected to the roof by one central flexible joint 25. The object of this arrangement is to permit lateral tilt of the said frame, the said flexible joint acting in the nature of a pivot.

Figs. 3 and 4 show the preferred forms of flexible joint employed. Referring firstly to Fig. 3, the joint shown therein comprises a bolt 28 and a co-operating rubber block 29 interposed between the frame members 30 and 31 to be joined and engaged within lipped portions of sockets 32 and 33 carried thereby.

The socket 32 is secured by screws 34 to the member 30 after the positioning in a recess in the latter of the bolt-head 35 and a washer 36. This bolt-head is either partly-spherical as shown or coned and the washer 36 is internally coned, as indicated, the taper thereof being different from the taper of the bolt-head when the latter is coned; thus relative movement between the members 30 and 31 is permitted by reason of the different shapes of the bolt-head and washer which together act as a universal joint. Obviously the holes in the washer and in the socket 32 and the space 37 in the recess in member 30 must be of sufficient size to allow this movement, but it is unnecessary to use a large hole for the passage of the bolt 28 through the member 31 so that the usual difficulties occasioned by wear when the bolt 28' moves independently of the frame member through which it passes in a large hole therein are obviated. On the contrary, the bolt 28 may be firmly engaged in and tightened up on the number 31.

A space 38 is left between the sockets 32 and 33 to allow relative movement of the corresponding frame members and bulging of the block 29 or equivalent deformable member under compression. The latter is preferably held at a certain degree of initial compression so as to avoid unnecessary looseness of the joint.

Referring now to Fig. 4, the arrangement shown therein is in general similar to that shown in Fig. 3, but is distinguished therefrom by the provision of means whereby both the frame members 39 and 40 to be flexibly joined may move if necessary. The bolt 28' utilized is substantially the same as the bolt 28 in the arrangement according to Fig. 3 and is connected at its head end to the member 40 in the same way as the bolt of Fig. 3. Instead of the nut being firmly engaged on the other frame member it is in the modified construction engaged in a recess in the said member, which latter is now provided with a socket-piece 41 exactly similar to the socket 32. This recess, designated 42, is adapted to house a washer 43 similar to the washer 36 and a co-operating coned or spherical head 44 carried by the bolt 28, or, if desired, integral with the nut 45. Thus the universal-joint arrangement previously described is in effect duplicated in the arrangement according to Fig. 4.

Returning now to Fig. 2, it will be noted that the roof 46 shown therein is not rigid with the cant-rails 14 but is flexibly connected thereto by joints 47 which may be similar to those above described. This arrangement is shown in plan in Fig. 5, from which it will be seen that the roof portion 46 is a central section separately inserted between the cant-rails 14 and the rear rigid body-portion 48. The purpose of this is to remove a certain amount of the strain on the roof, but this arrangement is not essential.

The same purpose is achieved in the arrangement according to Fig. 6, by the flexible mounting of substantially the whole of the roof 49, which is flexibly connected at the rear to a rigid body portion 50. This arrangement is conveniently used when an all-metal body is to be constructed.

While the invention has been described in its application to a saloon-type car body it will be clear that it is equally applicable to landaulet and like bodies in which the door-supporting frame previously described may be utilized.

What I claim as new and desire to secure by Letters Patent is:—

A vehicle-body structure, comprising a body, means for securing said body rigidly to a chassis, a door frame constituting a structurally separate unit from the body and secured to the chassis at its lower edge, doors hinged in the door frame, and flexible joints connecting a side and the top of said door frame to the body.

In testimony whereof I have signed my name to this specification this 26th day of August, 1927.

HERBERT FREDERICK COOPER.